Dec. 18, 1956 E. J. SCHAEFER 2,774,929
UNDER LOAD PROTECTIVE SYSTEM FOR ELECTRIC MOTOR
Filed May 27, 1953
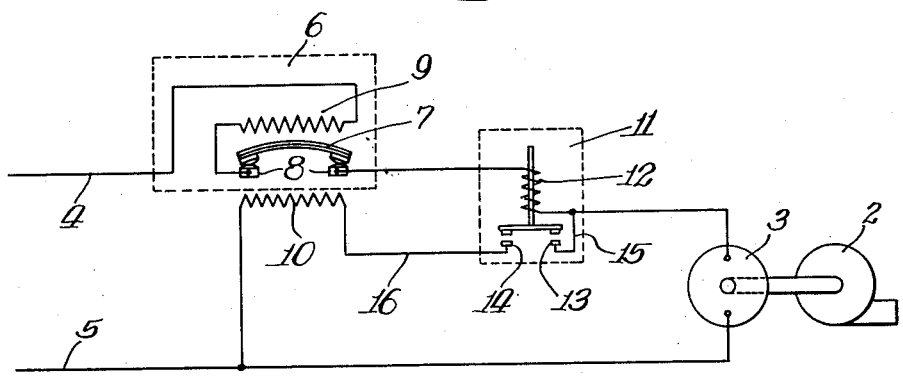
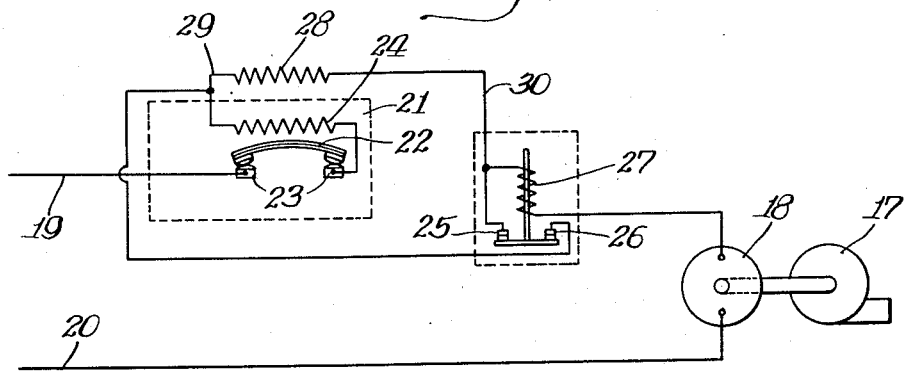
INVENTOR.
Edward J. Schaefer,
BY United States Patent Office 2,774,929
Patented Dec. 18, 1956

2,774,929

UNDER LOAD PROTECTIVE SYSTEM FOR ELECTRIC MOTOR

Edward J. Schaefer, Fort Wayne, Ind.

Application May 27, 1953, Serial No. 357,821

15 Claims. (Cl. 318—474)

This invention relates to a novel electrical means for controlling the operation of a pump for water wells or the like to prevent the pump from running when the normal supply of working fluid in the liquid state is exhausted.

With the rapidly expanding use of submersible deep well pumps it is becoming increasingly apparent that low water conditions in wells occur more frequently than had been realized, the situation being particularly critical in certain regions of the country. Low water levels in wells have been found to account for a number of pump failures and consequently it has become particularly important in the case of submersible motor and pump units to provide effective protection against these conditions in order to prolong the life of both the motors and the pumps.

The schemes which have heretofore been proposed for protecting against low water conditions have been based for the most part on water flow or actual water level in the well and have, therefore, been cumbersome and difficult to apply. My invention, as hereinafter described, provides a simple and inexpensive scheme for obtaining the desired protection by means of an electrical circuit arrangement which does not depend directly on measurement of water flow or actual water level. Moreover, my invention in one of its preferred forms has the important advantage that it can utilize as an integral part of the protective arrangement a conventional overload protector of the type normally provided in electric motor controls.

Accordingly, a primary object of my invention is to provide a novel means for preventing a pump from operating without a normal supply of working fluid in the liquid state.

A further object of the invention is to provide novel means for protecting a submersible motor and pump unit against low water conditions in a well.

Another object of the invention is to provide novel electrical means for obtaining low water protection in a submersible motor and pump unit without direct reliance on a measurement of actual water flow or water level.

An additional object of the invention is to provide a novel combination of an electrical control means with a normal overload protector for protecting a submersible motor and pump unit against low water conditions.

Other objects and advantages of the invention will become apparent from the subsequent detailed description taken in conjunction with the accompanying drawing wherein:

Fig. 1 is a schematic circuit diagram showing a preferred embodiment of the invention; and Fig. 2 is a schematic circuit diagram showing a modified form of the invention.

Broadly speaking, my invention utilizes an electrical operating characteristic of the motor, such as a change in the current flow or voltage at the motor, as an indication of whether or not the pump is actually pumping water or other working liquid. In a motor and pump combination for water wells or the like, it will be understood that if the normal supply of water is exhausted so that the pump sucks air, the load on the motor will drop far below normal with a corresponding change in both the current flow to the motor and the voltage at the motor. By interposing in the motor line a circuit opening means including a relay means operative in response to a change in an electrical characteristic of the motor during underload operation, I am able to obtain the desired low water protection in a simple, highly inexpensive, and entirely reliable manner. The relay circuit may include a lock out arrangement requiring manual resetting or, as hereinafter described, it includes a time delay means such as a heat responsive element in order to obtain relatively slow cycling and thereby avoid rapid off and on operation during low water periods. For maximum economy and operating adaptability, I prefer to employ a current sensitive relay means which readily responds to the marked decrease in current flow to the motor when operating below normal load, and the invention is described hereinafter solely in connection with a current sensitive relay means. However, it will be readily apparent to those skilled in the art that a voltage sensitive or watt sensitive relay arrangement could also be employed without departing from the basic principles of the invention.

Referring first to Fig. 1, a centrifugal pump 2 having an operating connection with an electric motor 3 are shown schematically. The motor 3 is connected to a source of electrical energy through a line comprising in this instance a pair of conductors 4 and 5. A circuit opening means 6 is interposed in the conductor 4 and in this instance comprises an overload protector of a conventional type having a heat responsive bimetallic element 7 which cooperates with a pair of spaced contacts 8 and a low resistance heating coil 9 connected across the source in series with the motor 3. As is well known in an overload protector of this character, the heating element 9 tends to heat up when the motor 3 operates under excessive load and ultimately the heat from the element 9 causes the bimetallic element 7 to disengage from the contacts 8 thereby interrupting the motor circuit to stop the operation of the motor. When the circuit is thus interrupted, the heating element 9 is thereby deenergized and after a suitable period the metallic element 7 cools down and flexes in the opposite direction to reestablish electrical contact across the contacts 8. If the overload condition at the motor 3 no longer prevails, the motor will then operate normally. However, if the overload condition still exists, the heating element 9 will be reenergized and the circuit will again be broken in the manner just described. Thus, the overload protector 6 will function in a time delayed automatic cycling manner until such time as the overload condition of the motor 3 is corrected.

For providing low water protection, my invention utilizes an auxiliary shunt or high resistance heating element 10 which is disposed in operative relation adjacent the bimetallic element 7 and is adapted to be connected across the line in parallel with the motor 3. For energizing the heating coil 10, a current sensitive relay means 11 is provided and includes a relay winding 12 interposed in the conductor 4 in series with the motor 3 and the contacts 8 of the overload protector 6. The relay means 11 also includes a pair of spaced relay contacts 13 and 14, the contact 13 being connected to the conductor 4 by a wire 15 and the contact 14 being connected to the heating element 10 by a wire 16.

During normal operation of the motor 3 when the pump 2 has an adequate supply of working liquid, the current flow through the relay winding 12 to the motor 3 is sufficient to activate the relay winding 12 so that the relay contacts 13—14 are open and the auxiliary heating element 10 is out of circuit. However, the relay means 11 is calibrated to drop out when the current flow to the motor 3 falls below a predetermined value. This value is one which will never be reached when the pump is pumping liquid, but as soon as the water level in the well falls to the point where the load on the motor undergoes a sharp decrease due to the fact that the pump 2 is sucking air, the current flow through the relay winding 12 will then be insufficient to hold the relay in open position and the relay will drop out thereby closing the relay contacts 13 and 14 so that the auxiliary heating element 10 is connected across the source in parallel with the motor 3. The heating element 10 being thus energized, it will be understood that the bimetallic element 7 will ultimately be actuated to break the motor circuit for stopping the operation of the motor. As explained before in connection with the overload protector coil 9, the bimetallic element 7 will gradually cool off and reestablish the electrical connection across the contacts 8. If by this time the supply of liquid in the well is back to normal, the motor 3 will then operate at normal load and the current flow to the motor will be sufficient to energize the relay winding 12 and thereby disconnect the auxiliary heating element 10. On the other hand, if the water level in the well is still too low, the underload condition of the motor 3 will still prevail so that the current flow is inadequate to energize the relay winding 12 with the result that the heating coil 10 will remain in circuit and effect another time delayed disruption of the motor circuit through the bimetallic element 7. This sequence of operations will obviously be repeated on a time delayed automatic cycling basis until such time as the low water condition of the well corrects itself.

Although not shown in the drawing, it will be understood that a lock out device could be provided for the bimetallic element 7 so that once the motor circuit is disrupted, operation of the motor will not be resumed until the controls are manually reset.

In Fig. 2 a slightly different arrangement embodying a current sensitive relay is illustrated. In this case, a centrifugal pump 17 having an operating connection with an electric motor 18 are again shown schematically, and the motor 18 is connected across a source of electrical energy by means of a pair of conductors 19 and 20. An overload protector 21 of the same type shown in Fig. 1 is connected in the motor circuit and comprises a bimetallic element 22 bridging a pair of spaced contacts 23 with a low resistance heating element 24 being connected in series with the contacts 23. However, in this case the contacts, designated at 25 and 26, of the current sensitive relay are reversed and are interposed in the conductor 19 in series with the overload protector contacts 23 and the heating coil 24. The relay winding, indicated at 27, is also connected in series between the relay contacts 25—26 and the motor 18. An auxiliary low resistance heating element 28 is disposed in operative relation adjacent the bimetallic element 22 and is connected across the relay contacts 25—26 by means of a wire 29 and a wire 30 so that the auxiliary heating coil 28 is normally short-circuited when the relay contacts 25—26 are closed. Thus, during operation of the motor 18 under normal load the current flow through the relay winding 27 to the motor 18 is sufficient to activate the relay and maintain the contacts 25—26 closed. In this circuit condition the motor 18 is connected across the source in series with the overload protector 21, the relay contacts 25—26, and the relay winding 27, and the auxiliary heating coil 28 is short circuited. The overload heating coil 24 being in the normal operating circuit serves to provide overload protection in the usual manner heretofore described.

However, when a low water condition exists so that the pump 17 begins to suck air and the motor 18 operates under substantially decreased load, the current flow to the motor through the relay winding 27 is inadequate to energize the latter and the relay drops out thereby breaking the connection across the relay contacts 25—26. When this happens, it will readily be seen that the short circuit condition of the auxiliary heating coil 28 is removed so that the latter is then connected across the source in series with the heating coil 24 of the overload protector. When so connected across the source, the heating element 28 gradually heats up until the bimetallic element 22 is actuated to disrupt the motor circuit at the contacts 23 thereby stopping the motor 18. When the bimetallic element 22 cools sufficiently, the connection across the contacts 23 is reestablished and if the low water condition has been corrected, the motor 18 will draw sufficient current to reenergize the relay winding 27 in order to close the relay contacts 25—26 and thereby return the heating element 28 to its normal short-circuited condition. However, if the low water condition still prevails, the current flow through the relay coil 27 will be insufficient to close the relay contacts 25—26 and the heating coil 28 will again be energized to repeat the disruption of the motor circuit. Obviously, this circuit can likewise be operated either on the time delayed automatically cycling basis hereinbefore described or a lock out arrangement can be provided which requires manual resetting to reestablish the motor circuit.

From the standpoint of low cost and reliability, the embodiment of the invention illustrated in Fig. 1 is preferred since the relay contacts 13—14 do not have to carry the current of the motor. Moreover, even when the heating element 10 is connected in the circuit, the relay contacts 13—14 carry merely a fraction of an ampere necessary to excite the coil 10. It will be understood that with this arrangement the relay contacts 13—14 can be relatively small and will have a relatively long life. In any event, failure of the relay contacts 13—14 would result merely in loss of the low water protection until the contacts could be replaced. In the Fig. 2 embodiment, somewhat heavier relay contacts 25—26 are necessary because these contacts carry the full current to the motor during normal running operation. It will also be seen that in the Fig. 2 arrangement a failure of the relay contacts 25—26 would result in false operation of the overload protector circuit.

Although the invention has been described primarily in conjunction with certain specific embodiments, it will be understood that various modifications and equivalent arrangements may be resorted to without departing from the scope of the invention as defined in the appended claims.

I claim:

1. In a pumping system of the type wherein the pump load decreases when the supply of working fluid for the pump is exhausted, the combination of an electric motor, a pump having a driving connection with the motor, a line for connecting the motor to a source of electrical energy, and a protective circuit for protecting the motor and pump against lack of working fluid comprising heat-responsive means interposed in the line for interrupting the supply of electrical energy to the motor, electric heating means disposed in operative relation adjacent said heat-responsive means, and relay means connected in circuit with the motor and responsive to an electrical characteristic of the motor during underload operation for energizing said heating means whereby to actuate said heat-responsive means for stopping the motor when the liquid supply of working fluid for the pump is exhausted.

2. In a pumping system of the type wherein the pump load decreases when the supply of working fluid for the pump is exhausted, the combination of an electric motor, a pump having a driving connection with the motor, a plurality of conductors for connecting said motor across a source, and a protective circuit for protecting the motor and pump against lack of working fluid comprising a heat-responsive element interposed in one of said conductors for interrupting the motor circuit in response to an increase in temperature of the heat-responsive element, an electric heating element disposed in operative relation adjacent said heat-responsive element, and means responsive to a predetermined decrease in the current flow to the motor for energizing said heating element whereby to effect time-delayed actuation of said heat-responsive element for stopping the motor when the liquid supply of working fluid for the pump is exhausted.

3. In a pumping system of the type wherein the pump load decreases when the supply of working fluid for the pump is exhausted, the combination of an electric motor, a pump having a driving connection with the motor, a plurality of conductors for connecting said motor across a source, and a protective circuit for protecting the motor and pump against lack of working fluid comprising a heat-responsive element interposed in one of said conductors for interrupting the motor circuit in response to an increase in temperature of the heat-responsive element, an electric heating element normally deenergized but adapted to be connected across the source and disposed in operative relation adjacent said heat-responsive element, current sensitive relay means connected in circuit with the motor and responsive to a predetermined decrease in the current flow to the motor for connecting said heating element across the source whereby to effect time-delayed actuation of said heat-responsive element for stopping the motor when the liquid supply of working fluid for the pump is exhausted.

4. In a pumping system of the type wherein the pump load decreases when the supply of working fluid for the pump is exhausted, the combination of an electric motor, a pump having a driving connection with the motor, a plurality of conductors for connecting said motor across a source, and a protective circuit for protecting the motor and pump against lack of working fluid comprising a heat-responsive element interposed in one of said conductors for interrupting the motor circuit in response to an increase in temperature of the heat-responsive element, an electric heating element normally deenergized but adapted to be connected across the source and disposed in operative relation adjacent said heat-responsive element, current sensitive relay means including a pair of relay contacts connected in circuit with said heating element and also including a relay winding connected in circuit with the motor for connecting said heating element across the source in response to a predetermined decrease in the current flow through said relay winding to the motor whereby to effect time-delayed actuation of said heat-responsive element for stopping the motor when the liquid supply of working fluid for the pump is exhausted.

5. In combination, an electric motor, a pump having a driving connection with the motor, a plurality of conductors for connecting said motor across a source, a heat-responsive element interposed in one of said conductors for interrupting the motor circuit in response to an increase in temperature of the heat-responsive element, an electric heating element normally deenergized but adapted to be connected across the source in parallel with the motor and disposed in operative relation adjacent said heat-responsive element, and current sensitive relay means connected in circuit with the motor and responsive to a predetermined decrease in the current flow to the motor for connecting said heating element across the source in parallel with the motor whereby to effect time-delayed actuation of said heat-responsive element for stopping the motor when the liquid supply of working fluid for the pump is exhausted.

6. In combination, an electric motor, a pump having a driving connection with the motor, a line comprising a plurality of conductors for connecting said motor across a source, a heat-responsive element interposed in the line for interrupting the motor circuit in response to an increase in temperature of the heat-responsive element, an electric heating element connected to one of said conductors and disposed in operative relation adjacent said heat-responsive element, said heating element being normally deenergized but being adapted to be connected across the source in parallel with said motor, and current sensitive relay means including a relay winding interposed in another of said conductors and connected in series with the motor and also including a pair of relay contacts one of which is connected to said heating element and the other of which is connected to said other conductor whereby to effect connection of said heating element across the source in parallel with the motor in response to a predetermined decrease in the current flow through said relay winding to the motor whereby to effect time-delayed actuation of said heat-responsive element for stopping the motor when the liquid supply of working fluid for the pump is exhausted.

7. In combination, an electric motor, a pump having a driving connection with the motor, a plurality of conductors for connecting said motor across a source, a heat-responsive element interposed in one of said conductors for interrupting the motor circuit in response to an increase in temperature of the heat-responsive element, an electric heating element disposed in operative relation adjacent said heat-responsive element, said heating element being normally short-circuited but adapted to be connected in series with the motor, and current sensitive relay means connected in circuit with the motor and responsive to a predetermined decrease in the current flow to the motor for removing the short circuit across said heating element and connecting the same in series with the motor whereby to effect time-delayed actuation of said heat-responsive element for stopping the motor when the liquid supply of working fluid for the pump is exhausted.

8. In combination, an electric motor, a pump having a driving connection with the motor, a plurality of conductors for connecting said motor across a source, a heat-responsive element interposed in one of said conductors for interrupting the motor circuit in response to an increase in temperature of the heat-responsive element, current sensitive relay means including a pair of relay contacts normally connected in series with said motor and a relay winding in series with said motor, and a heating element disposed in operative relation adjacent said heat-responsive element and connected across said relay contacts whereby said heating element is normally short-circuited, said heating element thereby being adapted to be connected in series with said relay winding and said motor in response to a predetermined decrease in the current flow to the motor for effecting time-delayed actuation of said heat-responsive element and thereby stopping the motor when the liquid supply of working fluid for the pump is exhausted.

9. In combination, an electric motor, a pump having a driving connection with the motor, a plurality of conductors for connecting said motor across a source, a heat-responsive element interposed in one of said conductors for interrupting the motor circuit in response to an increase in temperature of the heat-responsive element, current sensitive relay means including a pair of relay contacts normally connected in series with said motor and a relay winding in series with said motor, said relay contacts being normally closed when said relay winding is fully energized and being open when said relay winding is insufficiently energized, and a heating element disposed in operative relation adjacent said heat-responsive element and connected across said relay contacts whereby said heating element is normally short-circuited, said heating element thereby being adapted to be connected in series with said relay winding and said motor in response to a predetermined decrease in the current flow to the motor for effecting time-delayed actuation of said heat-responsive element and thereby stopping the motor when the liquid supply of working fluid for the pump is exhausted.

10. In a pumping system of the type wherein the pump load decreases when the supply of working fluid for the pump is exhausted, the combination of an electric motor, a pump having a driving connection with the motor, a line for connecting the motor to a source of electrical energy, and a protective circuit for protecting the motor and pump against lack of working fluid comprising heat-responsive means interposed in the line for interrupting the supply of electrical energy to the motor, a first electric heating element disposed in operative relation adjacent said heat-responsive means and connected in series with said heat-responsive means and said motor whereby said first heating element is adapted to be energized in response to an overload operating condition in the motor for actuating said heat-responsive means and stopping the motor, a second electric heating element disposed in operative relation adjacent said heat-responsive means, and relay means connected in circuit with the motor and responsive to an electrical characteristic of the motor during underload operation for energizing said second heating element whereby to actuate said heat-responsive means for stopping the motor when the liquid supply of working fluid for the pump is exhausted.

11. In an overload protector for an electric motor and pump combination having a heat-responsive element and a cooperating electric heating element connected across a source in series with the motor, the improvement which comprises an auxiliary heating element operatively disposed adjacent said heat-responsive element, said auxiliary heating element being normally deenergized but being adapted to be connected across the source, and current sensitive relay means connected in circuit with the motor and responsive to a predetermined decrease in the current flow to the motor for connecting said auxiliary heating element across the source whereby to effect time-delayed actuation of said heat-responsive element for stopping the motor when the liquid supply of working fluid for the pump is exhausted.

12. In combination, an electric motor, a pump having a driving connection with the motor, a line for connecting the motor to a source of electrical energy, heat-responsive means interposed in the line for interrupting the supply of electrical energy to the motor, a first electric heating element disposed in operative relation adjacent said heat-responsive means and connected in series with said heat-responsive means and said motor whereby said first heating element is adapted to be energized in response to an overload operating condition in the motor for actuating said heat-responsive means and stopping the motor, a second heating element normally deenergized but adapted to be connected across the source in parallel with said motor and disposed in operative relation adjacent said heat-responsive means, and current sensitive relay means connected in circuit with the motor and responsive to a predetermined decrease in current flow to the motor for connecting said second heating element across the source whereby to effect time-delayed actuation of said heat-responsive means for stopping the motor when the liquid supply of working fluid for the pump is exhausted.

13. In combination, an electric motor, a pump having a driving connection with the motor, a line comprising a plurality of conductors for connecting the motor to a source of electrical energy, heat-responsive means interposed in the line for interrupting the supply of electrical energy to the motor, a first electric heating element disposed in operative relation adjacent said heat-responsive means and connected in series with said heat-responsive means and said motor whereby said first heating element is adapted to be energized in response to an overload operating condition in the motor for actuating said heat-responsive means and stopping the motor, a second electric heating element connected to one of said conductors and disposed in operative relation adjacent said heat-responsive means, said second heating element being normally deenergized but being adapted to be connected across the source in parallel with the motor, and current sensitive relay means including a relay winding interposed in another of said conductors and connected in series with the motor and also including a pair of relay contacts one of which is connected to said second heating element and the other of which is connected to said other conductor whereby to effect connection of said second heating element across the source in parallel with the motor in response to a predetermined decrease in the current flow through said relay winding to the motor for effecting time-delayed actuation of said heat-responsive means and thereby stopping the motor when the liquid supply of working fluid for the pump is exhausted.

14. In combination, an electric motor, a pump having a driving connection with the motor, a line for connecting the motor to a source of electrical energy, heat-responsive means interposed in the line for interrupting the supply of electrical energy to the motor, a first electric heating element disposed in operative relation adjacent said heat-responsive means and connected in series with said heat-responsive means and said motor whereby said first heating element is adapted to be energized in response to an overload operating condition in the motor for actuating said heat-responsive means and stopping the motor, a second heating element disposed in operative relation adjacent said heat-responsive means, said second heating element being normally short-circuited but being adapted to be connected in series with the motor, and current sensitive relay means connected in circuit with the motor and responsive to a predetermined decrease in the current flow to the motor for removing the short circuit across said second heating element and connecting the same in series with the motor whereby to effect time-delayed actuation of said heat-responsive means for stopping the motor when the liquid supply of working fluid for the pump is exhausted.

15. In combination, an electric motor, a pump having a driving connection with the motor, a line for connecting the motor to a source of electrical energy, heat-responsive means interposed in the line for interrupting the supply of electrical energy to the motor, a first electric heating element disposed in operative relation adjacent said heat-responsive means and connected in series with said heat-responsive means and said motor whereby said first heating element is adapted to be energized in response to an overload operating condition in the motor for actuating said heat-responsive means and stopping the motor, current sensitive relay means including a pair of relay contacts normally connected in series with said motor and a relay winding in series with said motor, and a second electric heating element disposed in operative relation adjacent said heat-responsive means and connected across said relay contacts whereby said second heating element is normally short-circuited, said second heating element thereby being adapted to be connected in series with said relay winding and said motor in response to a predetermined decrease in the current flow through said relay winding to the motor whereby to effect time-delayed actuation of said heat-responsive means for stopping the motor when the liquid supply of working fluid for the pump is exhausted.

References Cited in the file of this patent

UNITED STATES PATENTS

| 1,063,179 | Burnham | June 3, 1913 |
| 1,731,373 | Dauler | Oct. 15, 1929 |
| 2,063,981 | Brunner | Dec. 15, 1936 |